US 7,810,669 B2

(12) United States Patent
Westenberger (10) Patent No.: US 7,810,669 B2
(45) Date of Patent: Oct. 12, 2010

(54) REPLACEABLE CARTRIDGE FOR LIQUID HYDROGEN

(75) Inventor: Andreas Westenberger, Buxtehude (DE)

(73) Assignee: Airbus Deutschland GmbH (DE)

( * ) Notice: Subject to any disclaimer, the term of this patent is extended or adjusted under 35 U.S.C. 154(b) by 1161 days.

(21) Appl. No.: 11/072,550

(22) Filed: Mar. 4, 2005

(65) Prior Publication Data

US 2005/0224514 A1    Oct. 13, 2005

Related U.S. Application Data

(60) Provisional application No. 60/598,257, filed on Aug. 3, 2004.

(30) Foreign Application Priority Data

Mar. 5, 2004    (DE)    ........................ 10 2004 010 937

(51) Int. Cl.
*F17C 3/00*    (2006.01)
*F17C 13/00*    (2006.01)
*B64G 1/40*    (2006.01)

(52) U.S. Cl. .............................. 220/560.07; 220/560.1; 220/560.11; 220/560.12; 220/901; 244/172.3

(58) Field of Classification Search ................................ 220/560.04–560.15, 562–564, 586–592, 220/901; 244/172.2, 172.3
See application file for complete search history.

(56) References Cited

U.S. PATENT DOCUMENTS

| | | | | |
|---|---|---|---|---|
| 3,544,382 A | * | 12/1970 | Wandschneider et al. ..... | 429/25 |
| 3,695,050 A | * | 10/1972 | Bancroft ...................... | 62/48.3 |
| 3,891,147 A | | 6/1975 | Kleine | |
| 3,979,005 A | * | 9/1976 | Robinson et al. ........ | 220/560.07 |
| 4,108,329 A | * | 8/1978 | Kabilka et al. .............. | 220/590 |
| 4,154,364 A | * | 5/1979 | Hagiwara et al. ....... | 220/560.12 |
| 4,225,320 A | * | 9/1980 | Gell ............................ | 48/191 |
| 4,261,956 A | * | 4/1981 | Adlhart ...................... | 422/239 |
| 4,386,309 A | * | 5/1983 | Peschka ..................... | 322/2 R |
| 4,750,631 A | * | 6/1988 | Hastings et al. ............. | 220/501 |
| 4,964,524 A | * | 10/1990 | Halene ....................... | 220/586 |
| 5,376,200 A | * | 12/1994 | Hall ........................... | 156/173 |
| 5,462,021 A | * | 10/1995 | Minami et al. ................ | 123/3 |
| 5,593,640 A | * | 1/1997 | Long et al. .................. | 422/111 |

(Continued)

FOREIGN PATENT DOCUMENTS

DE    195 46 618 C2    7/1998

(Continued)

OTHER PUBLICATIONS

Haussinger, Peter et al., Ullmann's Encyclopedia of Industrial Chemistry, Hydrogen, Chapters 7 and 9, Wiley-VCH Verlag GmbH & Co. KGaA, on-line posting Jun. 15, 2000, © 2002.

*Primary Examiner*—Mickey Yu
*Assistant Examiner*—Ned A Walker
(74) *Attorney, Agent, or Firm*—Lerner, David, Littenberg, Krumholz & Mentlik, LLP (57) ABSTRACT

A replaceable cartridge for coupling to a consumer or to a filling station, wherein the replaceable cartridge comprises at least one disconnectable connection coupling for connection to the consumer or the filling station. Furthermore, the replaceable cartridge comprises a tank for holding liquid hydrogen.

10 Claims, 5 Drawing Sheets

U.S. PATENT DOCUMENTS

| | | | | |
|---|---|---|---|---|
| 5,658,013 | A * | 8/1997 | Bees et al. | 280/831 |
| 5,673,939 | A * | 10/1997 | Bees et al. | 280/831 |
| 5,702,491 | A * | 12/1997 | Long et al. | 48/197 R |
| 5,932,365 | A * | 8/1999 | Lin et al. | 429/12 |
| 6,182,717 | B1 * | 2/2001 | Yamashita | 141/82 |
| 6,196,255 | B1 | 3/2001 | Poillucci | |
| 6,257,360 | B1 * | 7/2001 | Wozniak et al. | 180/69.5 |
| 6,354,321 | B1 * | 3/2002 | Horst et al. | 137/255 |
| 6,418,275 | B1 * | 7/2002 | Yang | 392/441 |
| 6,676,163 | B2 * | 1/2004 | Joitescu et al. | 280/834 |
| 6,755,225 | B1 * | 6/2004 | Niedwiecki et al. | 141/231 |
| 6,810,925 | B2 * | 11/2004 | Graham et al. | 141/98 |
| 6,834,494 | B2 * | 12/2004 | Lohner et al. | 60/218 |
| 6,834,508 | B2 * | 12/2004 | Bradley et al. | 62/46.1 |
| 6,932,847 | B2 * | 8/2005 | Amendola et al. | 48/76 |
| 6,986,258 | B2 * | 1/2006 | Bradley et al. | 62/46.1 |
| 7,052,658 | B2 * | 5/2006 | Arthur et al. | 422/198 |
| 7,082,354 | B2 * | 7/2006 | Watanabe | 700/282 |
| 7,086,236 | B2 * | 8/2006 | Fischer et al. | 62/48.1 |
| 7,137,474 | B2 * | 11/2006 | Yokote | 180/314 |
| 7,169,489 | B2 * | 1/2007 | Redmond | 429/12 |
| 7,271,567 | B2 * | 9/2007 | Dunn et al. | 320/101 |
| 7,438,732 | B2 * | 10/2008 | Shurtleff et al. | 48/61 |
| 2002/0022162 | A1 * | 2/2002 | Kagitani | 429/17 |
| 2002/0117123 | A1 * | 8/2002 | Hussain et al. | 123/3 |
| 2004/0016769 | A1 * | 1/2004 | Redmond | 222/3 |
| 2004/0023087 | A1 * | 2/2004 | Redmond | 429/19 |
| 2004/0040316 | A1 * | 3/2004 | Bradley et al. | 62/46.1 |
| 2004/0067398 | A1 * | 4/2004 | Watanabe | 429/24 |
| 2004/0191588 | A1 * | 9/2004 | Eshraghi et al. | 429/19 |
| 2005/0008903 | A1 * | 1/2005 | Bourilkov et al. | 429/9 |
| 2005/0022883 | A1 * | 2/2005 | Adams et al. | 137/614.03 |
| 2005/0056641 | A1 * | 3/2005 | Drake et al. | 220/4.12 |
| 2005/0058879 | A1 * | 3/2005 | Guay | 429/38 |
| 2005/0095481 | A1 * | 5/2005 | Shibata et al. | 429/30 |
| 2005/0106441 | A1 * | 5/2005 | Yamamoto et al. | 429/34 |
| 2005/0123818 | A1 * | 6/2005 | Ihara | 429/34 |
| 2005/0268555 | A1 * | 12/2005 | Amendola et al. | 48/61 |
| 2005/0271905 | A1 * | 12/2005 | Dunn et al. | 429/11 |
| 2006/0059778 | A1 * | 3/2006 | Shurtleff et al. | 48/61 |
| 2006/0174952 | A1 * | 8/2006 | Curello et al. | 137/614.03 |
| 2006/0210854 | A1 * | 9/2006 | Taniguchi | 429/26 |
| 2007/0020510 | A1 * | 1/2007 | Dunn et al. | 429/65 |

FOREIGN PATENT DOCUMENTS

| | | |
|---|---|---|
| EP | 0 560 366 A1 | 9/1993 |
| EP | 0 779 468 B1 | 6/1997 |

* cited by examiner

REPLACEABLE CARTRIDGE FOR LIQUID HYDROGEN

CROSS-REFERENCE TO RELATED APPLICATIONS

This application claims the benefit of the filing date of U.S. Provisional Patent Application No. 60/598,257 filed Aug. 3, 2004, the disclosure of which is hereby incorporated herein by reference.

BACKGROUND OF THE INVENTION

The present invention relates to the storage of hydrogen, preferably in vehicles, such as for example aircraft. In particular, the present invention relates to a replaceable cartridge for coupling to a consumer or to a filling station, a connection coupling for a consumer or for a filling station, an aircraft comprising a respective replaceable cartridge as well as a method for handling a replaceable cartridge.

In its liquid form, hydrogen has been used for some considerable time in industry and in space technology. In its gaseous form, hydrogen is available in hybrid metal storage devices or pressure tanks. Up to now, no corresponding system has been available for liquid hydrogen.

SUMMARY OF THE INVENTION

There may be a need to simplify the handling of liquid hydrogen.

According to one exemplary embodiment of the present invention, a replaceable cartridge for coupling to a consumer or to a filling station is provided, wherein the replaceable cartridge comprises at least one disconnectable connection coupling for connection to the consumer or to the filling station. Furthermore, the replaceable cartridge comprises a tank for receiving liquid hydrogen.

The replaceable cartridge is for example re-usable. It is believed that a very good energy density at a comparatively low weight may be achieved in the design of the replaceable cartridge for storing liquid hydrogen. This may be advantageous where the storage quantity exceeds 5 kg. Furthermore, by providing a replaceable cartridge, safe, quick and easy handling of the energy storage device with the liquid hydrogen is achieved.

In this context it should be pointed out that, for the sake of simplicity, the following description only refers to liquid hydrogen. However, it should be stressed that the present invention also relates to the application of partially solidified hydrogen, so-called "slush hydrogen". In other words, in the present patent specification the designation "liquid hydrogen" covers both liquid hydrogen and partially solidified hydrogen.

The design of the replaceable cartridge for storing the liquid hydrogen may make it possible to store a relatively large quantity of hydrogen in as little space as possible and with a storage weight as low as possible, thus making it possible to optimise energy storage if hydrogen is considered to be the energy storage medium.

According to a further embodiment of the present invention, a replaceable cartridge is provided which is designed for application in aircraft.

For example, this embodiment of a replaceable cartridge can be used in an on-board water generation system (OBOW-AGS) which is based on the operation of a fuel cell. In this way, with the use of hydrogen and oxygen, outstanding water quality that always remains constant may be achieved because the purest form of water can be produced directly. The water obtained in this way may, for example, be used directly for flushing toilets and/or for cabin humidification. If minerals are added, drinking water can be produced. This may make it possible, for example, to provide water on board an aircraft without the need for taking water on board when the aircraft is on the ground. Furthermore, this process is assumed to generate a sufficient quantity of electrical energy for it to be supplying part of the needs of the on-board electrical system. Furthermore, the thermal output resulting during this process may be used to reduce the requirement for electrical heat. To this effect it is, for example, possible to use the thermal output for heating the passenger cabin. Overall, it is believed that the use of such a system in conjunction with the easy-change cartridge according to the invention may result in a reduction in weight, and thus also cost advantages.

It is believed that it is the replaceable cartridge according to the invention which for the first time makes it possible to generate water on board an aircraft, because up to now the required hydrogen was neither provided on board an aircraft nor at airports. According to the present invention, a replaceable cartridge system can now be achieved in which the replaceable cartridges can be exchanged whenever required. Such easy-change cartridges can easily be stored without any problems at an airport too. Furthermore, in an emergency situation no direct detonating gas explosion is to be expected in the case of liquid hydrogen, a factor which provides increased safety.

According to a further embodiment of the present invention, the tank of the replaceable cartridge is designed or arranged for receiving liquid or partially liquefied hydrogen. In order to subsequently provide gaseous hydrogen to a consumer, heat is fed to the liquid or partially liquefied hydrogen in the tank so that said hydrogen assumes a gaseous state of aggregation. The gaseous hydrogen is then supplied to a consumer, for example by way of the connection couplings.

In an advantageous way the replaceable cartridge according to the present invention may make it possible for a replaceable cartridge to be brought on board an aircraft when required and for said replaceable cartridge to then be easily connected to the aircraft's on-board hydrogen system. If the cartridge is empty, i.e. if the hydrogen has been used up or has fallen below a certain threshold value, the replaceable cartridge can conveniently be exchanged for a full replaceable cartridge. The empty replaceable cartridge can then be refilled in a corresponding filling station and can be returned to the cycle.

According to a further embodiment of the present invention, the tank comprises an internal tank and an external tank. Between the internal tank and the external tank superinsulation is provided which thermally decouples the internal tank and the external tank in such a way that the internal tank is suitable for storing liquid hydrogen or partially liquefied hydrogen.

According to a further embodiment of the present invention, taking into consideration ambient temperatures and requirements, i.e. hydrogen requirements of the consumer, the superinsulation can be designed such that heat transmission from the environment with the ambient temperature to the internal tank by way of the superinsulation is sufficient during operation to cover the consumer's requirement for gaseous hydrogen. It is thus possible in a simple way to provide a replaceable cartridge which "automatically" forms a sufficient quantity of gaseous hydrogen from the liquid hydrogen to cover the requirements of the consumer. This may make it possible to provide a replaceable cartridge which does not require any regulating devices for controlling the quantity of hydrogen delivered. In this way it is possible to provide a simple and cost-effective replaceable cartridge. Moreover, because this embodiment does not involve failure of a regulator system, it is possible to provide a very safe replaceable cartridge.

According to a further embodiment of the present invention, at least one protective cap is provided for each of the at least one disconnectable connection couplings. For example, this protective cap can protect the connection couplings against mechanical damage. The protective cap can be designed to provide not only mechanical protection, but also a leakage safety device. To this effect, in a space defined by the protective cap, a catalyst can be provided which utilises any hydrogen that evaporates from the connection coupling into said space.

In an advantageous way this may prevent any accumulation of evaporating hydrogen, for example in any cavities in the surroundings of the replaceable cartridge.

According to a further embodiment of the present invention, a device for supplying heat to the internal tank is provided. By controlling the heat supplied, an output quantity of gaseous hydrogen can be controlled which can be supplied to the consumer. In an advantageous way it may thus be possible to match the replaceable cartridge to the various fields of application and to the various consumers.

According to a further advantageous embodiment of the present invention, the replaceable cartridge comprises encoding. Such encoding makes it possible, for example, for a user, a consumer or a filling station to detect, for example automatically, the type of replaceable cartridge involved. For example, the information contained in the code may relate to the following: a type of filling; a temperature of the stored hydrogen; an average supply quantity of gaseous hydrogen to a consumer; a fill pressure; a shape; a tank size; a maximum removal quantity; an application; a maximum heat infeed and/or a maximum operating pressure. Furthermore, for example a nominal volume can be encoded.

According to a further embodiment of the present invention, encoding is implemented by means of the disconnectable connection couplings. For example, this can be implemented by the form and/or dimensions of the connection couplings. Advantageously, encoding may be implemented such that corresponding connection couplings can only be connected to matching or suitable consumers or filling stations. In this way safe handling of the replaceable cartridges can be ensured.

According to a further embodiment of the present invention, a connection coupling for a consumer or a filling station is stated wherein the connection coupling is designed for interaction with an easy-change cartridge according to an embodiment of the present invention.

Furthermore, according to the present invention an aircraft with a replaceable cartridge according to the present invention is provided.

Furthermore, the present invention relates to a method for handling a replaceable cartridge according to the present invention, wherein the replaceable cartridge is arranged in a vehicle, and wherein said replaceable cartridge is removed from the vehicle if the fill level drops below a certain value. According to a further embodiment of the present invention, the vehicle is an aircraft.

In other words, according to the present invention, a replaceable cartridge system is provided which is designed for storing liquid hydrogen or partially liquefied hydrogen. The cartridge system can in particular comprise an encoded connection coupling system which can only be connected to respective connection couplings. In this way it is possible to provide simple and safe handling of storage devices for liquid hydrogen, which storage devices are moreover very user-friendly. In particular when used in aircraft, the present invention provides safe and easy handling. Furthermore, as a result of the present invention, any hydrogen infrastructure on an airport can be reduced to a single corresponding storage location, which if required is supplied by a central filling and service station for replaceable cartridges.

In the following, advantageous embodiments of the present invention are described with reference to the figures:

DETAILED DESCRIPTION

Figure 1:
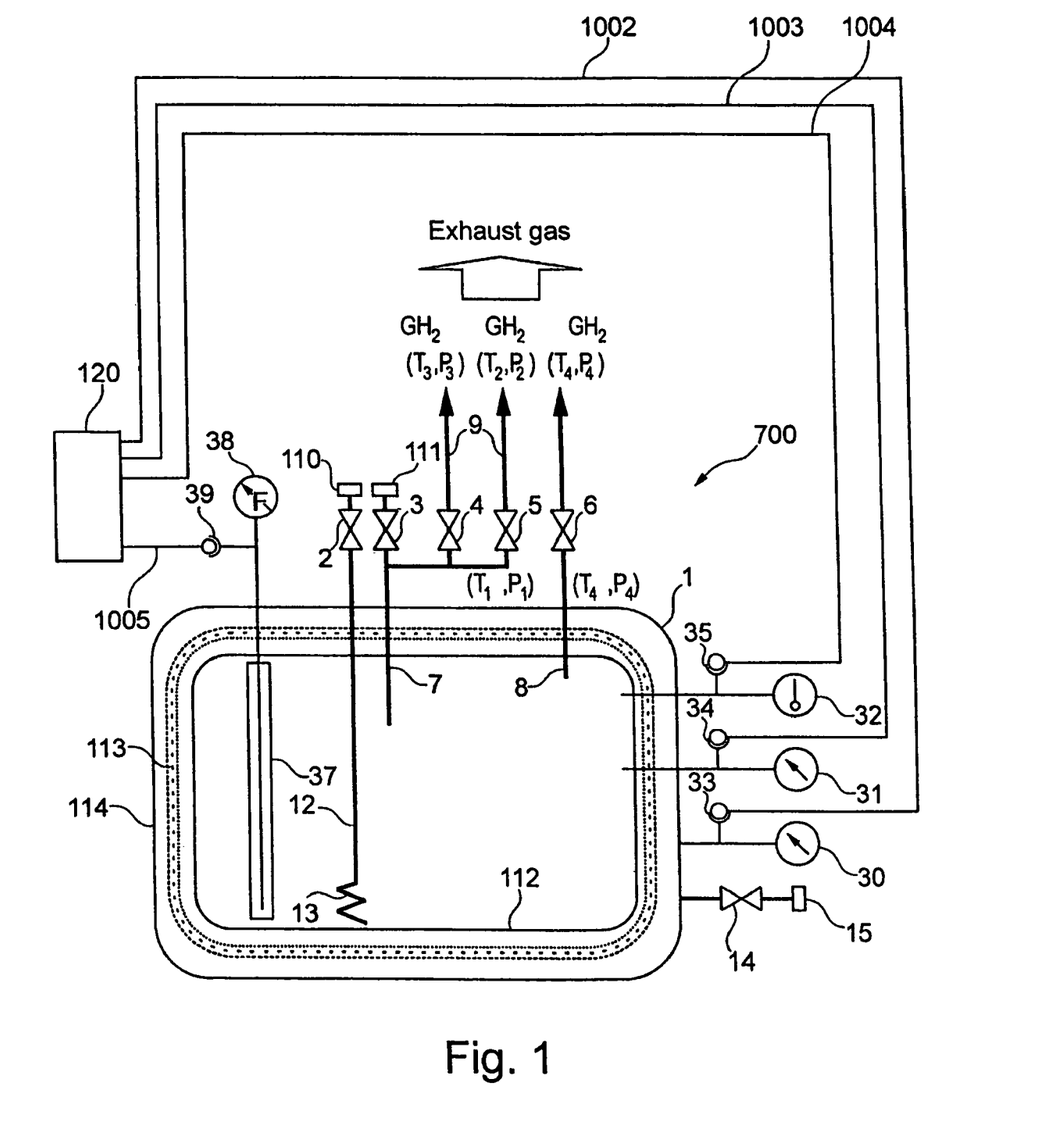
FIG. 1 shows a section view of an embodiment of a replaceable cartridge according to the present invention.
Figure 3:
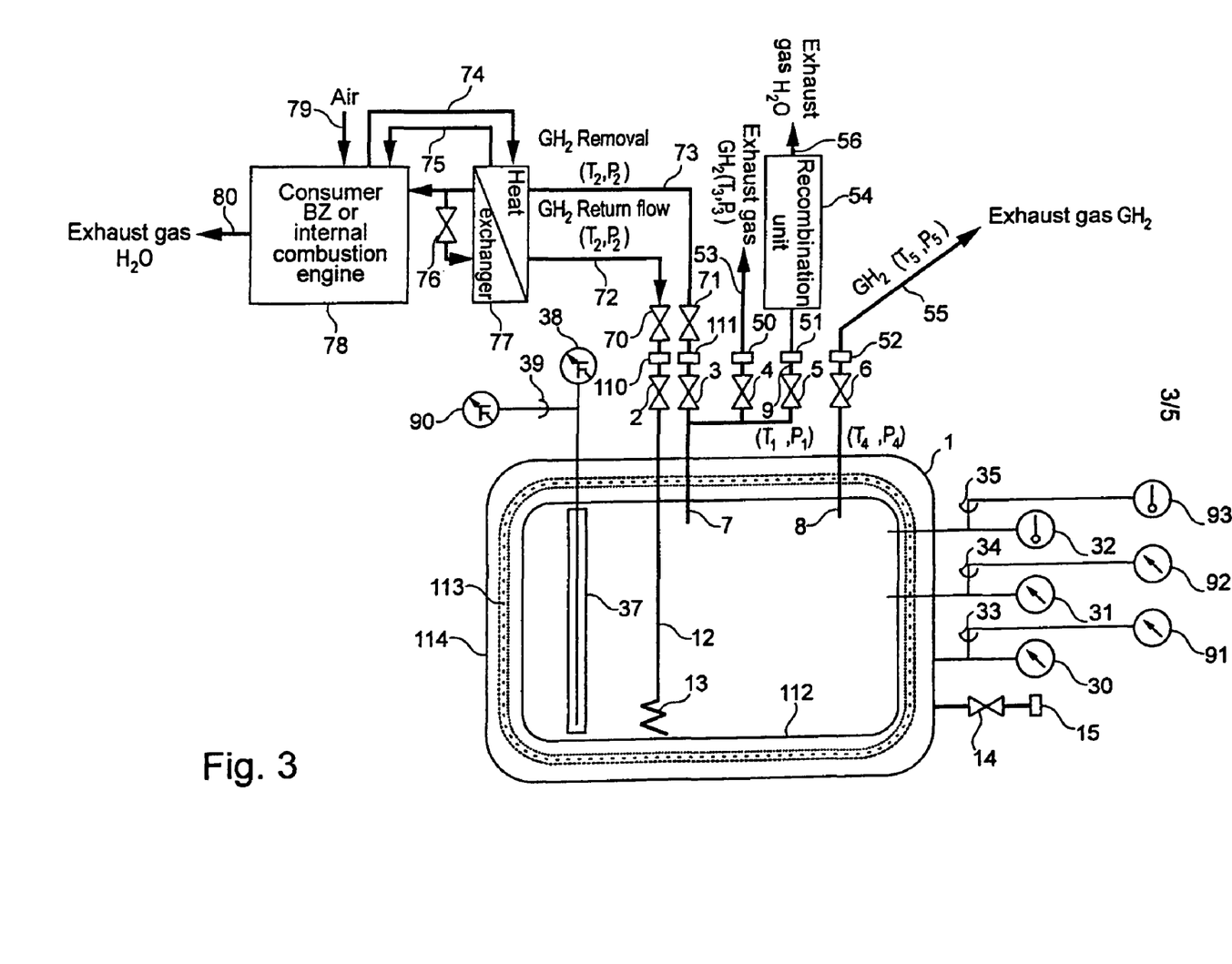
FIG. 3 shows a section view of an embodiment of a replaceable cartridge according to the present invention, during removal of hydrogen.
Figure 4:
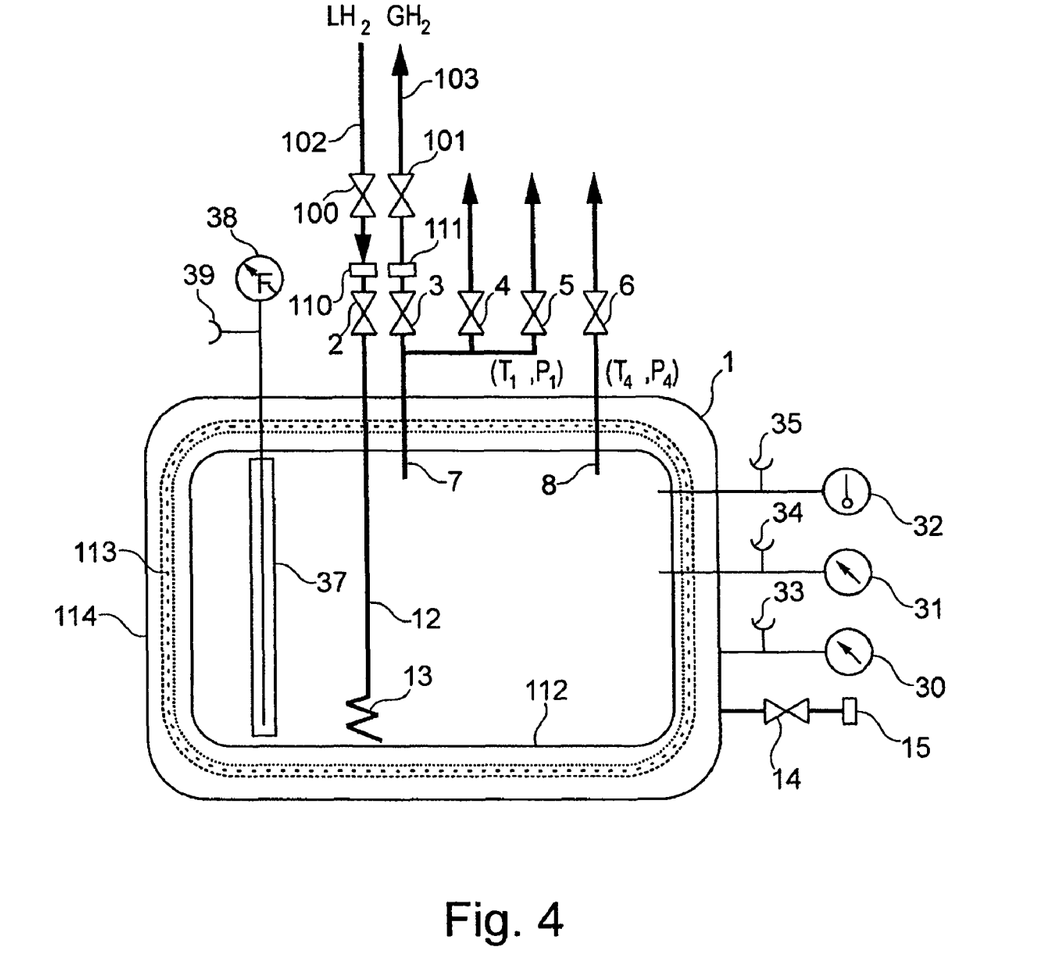
FIG. 4 shows a section view of an embodiment of a replaceable cartridge according to the present invention, for refueling with hydrogen.

It should be pointed out that in order to simplify illustration, FIGS. 1 and 4 show automated logic diagrams for various elements. In the following description of FIGS. 1 to 4 identical or corresponding elements have the same reference numbers.

FIG. 1 shows a section view of a replaceable cartridge comprising an embodiment of the present invention for coupling to a consumer or to a filling station. Reference in the following to "replaceable cartridge" shall be construed as a reference to the "replaceable cartridge 700." The replaceable cartridge comprises a plurality of disconnectable connection couplings, which are described in detail below, for connection to the consumer or the filling station, as well as a tank 1 for holding liquid hydrogen. The tank 1 comprises an external tank 114 as well as an internal tank 112. The external tank 114 and the internal tank 112 are thermally decoupled by means of an insulation, for example a superinsulation 113. The superinsulation 113 can for example be implemented by means of a vacuum. Preferably, this decoupling is implemented such that at an ambient temperature at the location of use, and at a predefined consumption or requirement of gaseous hydrogen by the consumer, thermal transfer from the environment at ambient temperature to the internal tank 112 is sufficient to bring a quantity of hydrogen from the liquid or partially liquefied state to a gaseous state which corresponds to the need of the consumer. In this way it is possible to provide a self-sufficient system which at a constant ambient temperature automatically feeds a constant quantity of gaseous hydrogen to the consumer. Furthermore, for example, the delivery of gaseous hydrogen to the consumer can be controlled by way of controlling the ambient temperature. Furthermore, it is possible to provide a replaceable cartridge which need not comprise a regulating system. In particular, in this way a very safe replaceable cartridge can be provided because no failure of a regulating system may occur, and the delivered quantity of gaseous hydrogen is always predictable on the basis of the ambient temperature.

According to the present invention it is however also possible to provide a submerged tube 12 comprising a heat exchanger 13 in order to feed heat to the internal tank 112 in a targeted and controlled way and in order to control the quantity of gaseous hydrogen to be delivered.

The replaceable cartridge further comprises a check valve 2, which for example serves to control the heat supply to the internal tank 112 by way of the submerged tube 12 and the heat exchanger 13. Furthermore, an additional check valve 3 can be provided which is coupled to a removal pipe 7 which leads from the outside of the tank 1 through the external tank 114 and the insulation 113 into the internal tank 112. Hydrogen removal and filling can be carried out by way of the valves 2 and 3. Furthermore, the removal pipe 7 is coupled to overpressure valves 4 and 5, which can relieve pressure to the surroundings if, for example, overpressure builds up in the internal tank 112. However, the overpressure valves 4 and 5 can also be arranged in conjunction with exhaust pipes 9 for removing exhaust gases from the internal tank 112. For example, gaseous hydrogen ($GH_2$) can be an exhaust gas.

Furthermore, the replaceable cartridge according to this embodiment comprises a vent pipe 8 which leads from the outside of the replaceable cartridge to the internal tank 112. An overpressure valve 6 is arranged on the vent pipe 8.

Reference number 14 designates a check valve which comprises a coupling 15 and a sealing cap. The sealing cap can for example be made such that it protects the coupling against mechanical influences. Furthermore, the sealing cap can be designed to create a space around the coupling 15 in such a way that any evaporating hydrogen is collected in this space. In an advantageous way a catalyst is then provided in this space, wherein said catalyst automatically utilises the evaporating hydrogen and converts it for example to water, which poses no problem when being handled.

Reference numbers 30 and 31 designate pressure gauges which may for example have a drag indicator function. The pressure gauges indicate the pressure in the internal tank 112. Reference number 32 designates a thermometer which may also have a drag indicator function, and which indicates a temperature in the internal tank 112 of the replaceable cartridge. In conjunction with the pressure gauges 30 and 31 and the thermometer 32, couplings 33, 34 and 35 are provided which are used to connect the cartridge to the consumer. These couplings make it possible for the consumer for example to register pressure or a pressure development in the internal tank of the replaceable cartridge, or to register a temperature in the internal tank 112.

Reference number 37 designates a fill level sensor in the internal tank 112, which interacts with a corresponding fill level indicator 38 arranged on the outside of the replaceable cartridge and on the outside displays the fill state of the liquid hydrogen in the internal tank 112. It is also possible for the fill level to be picked up by a consumer, by means of a coupling 39.

Reference numbers 110 and 111 designate couplings with sealing caps which are provided above the check valves 2 and 3. Preferably, the consumer is connected to the couplings 110 and 111. The check valves 2 and 3 prevent hydrogen from flowing out when the tank is not closed off. Advantageously, the couplings 110 and 111 are arranged coaxially and the valves 2 and 3 close or open automatically during the connection procedure or during decoupling.

Figure 5:
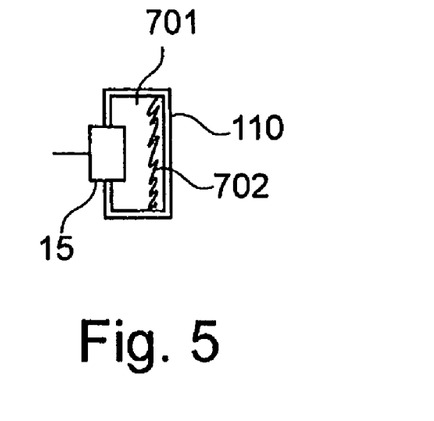
FIG. 5 shows a coupling comprising a space and a catalyst.

The couplings 110 and 111 can comprise corresponding sealing caps which mechanically protect the valves 2 and 3. Furthermore, the sealing caps of the couplings 110 and 111, in a way similar to that of the sealing cap of coupling 15, can be designed such that they define a space 701 in which for example a catalyst 702 is provided. By means of the catalyst, evaporating hydrogen in the space 701 can be catalytically utilized, which can prevent unintended issuing of gaseous hydrogen, or such hydrogen can be bound.

Reference number 120 designates a monitoring system which is connected to the respective couplings 39, 35, 34, 33 by electrical connections 1005, 1004, 1003, 1002, respectively, shown in FIG. 1. Furthermore, the monitoring system 120 can also be designed for controlling or checking a function or activation of the valves 2, 3, 4, 5, 6 and 14.

Moreover, the monitoring system 120 can be designed to control the supply of heat by way of the heat exchanger 13, and thus to control the quantity of gaseous hydrogen that is delivered.

Preferably the monitoring system 120 is coupled to the fill level sensor 37 and the fill level indicator 38, to the temperature provider and indicator 32, the internal pressure provider and indicator 31, and a measuring system 30 (the pressure gauge) for monitoring the low pressure between the internal tank 112 and the external tank 114. The respective connections between the monitoring system 120 are shown in FIG. 1. For example, a connection between the respective sensors and valves and the monitoring system 120 can be implemented by means of corresponding electrical connections, 1002, 1003, 1004, and 1005. When the replaceable cartridge is connected to the consumer, these signals can be displayed or processed on board the consumer, for example on corresponding display devices in an aircraft.

As mentioned above, the valves 4, 5 and 6 are overpressure valves. Valve 5 responds if for example the pressure level reaches $p_2$ and the process of degassing due to "superposition" commences. Valve 4 responds when the pressure level reaches $p_3$ ($p_3 > p_2$), i.e. when the pressure can no longer be released by valve 5. If the internal pressure $p_3$ is exceeded or pipe 7 and/or downstream pipes are blocked, the overpressure valve 6 opens at a pressure of $p_4$.

For example, the check valve 14 and the coupling 15 can be designed as a connection element to a vacuum pump.

Figure 2:
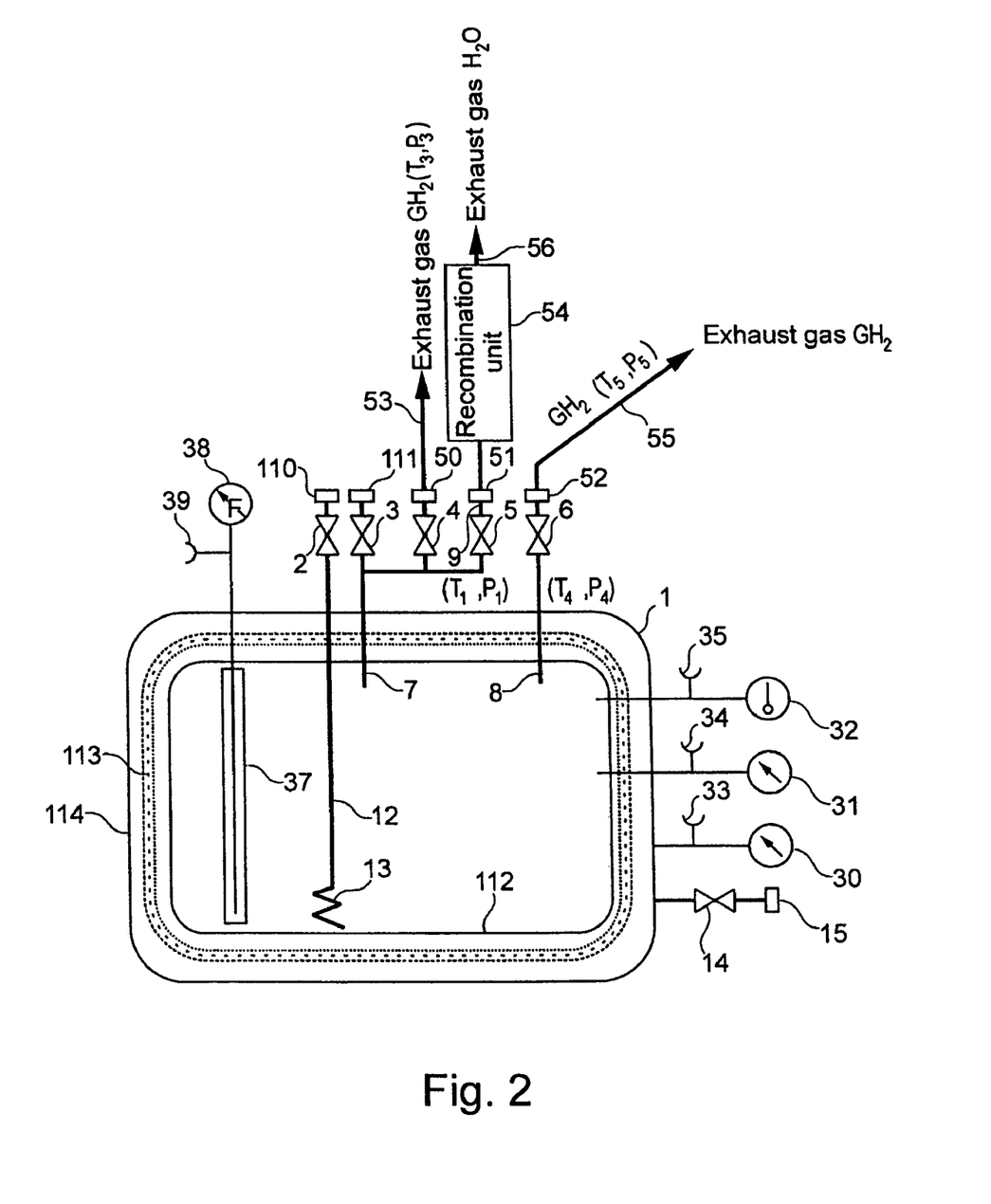
FIG. 2 shows a section view of an embodiment of a replaceable cartridge according to the present invention, in a storage state.

FIG. 2 shows the replaceable cartridge shown in FIG. 1 in its storage state. In the storage state and/or transport state, no consumer is connected to the replaceable cartridge. According to the present invention, the valves 2 and 3 are closed. As described above, protective caps 110 and 111 can be provided which protect the respective connection couplings. Such protective caps can for example also be blind caps.

Couplings 50, 51 and 52 can be provided on the valves 4, 5 and 6. By way of coupling 52, valve 6 can be connected to an exhaust pipe 55.

By way of coupling 51, valve 5 can be connected to a recombination unit 54 which in turn is connected to an exhaust pipe 56 by way of which, for example, water can be conveyed. By way of coupling 50, furthermore valve 4 can be connected to a further exhaust pipe 53 by way of which an exhaust gas, for example $GH_2$, can be conveyed.

During "normal" heat infeed and extended storage it is, for example, possible for the pressure level $p_2$ to be exceeded. In such a case valve 5 opens, thus relieving the tank by way of a recombination unit (optional) or by way of an exhaust pipe (pipe into the open—not shown). If the heat infeed becomes too high as a result of complete loss of the insulation, for example as a result of loss of the vacuum of the superinsulation 113, relief takes place by way of valve 4. In particular, relief by way of valve 4 takes place if a pressure $p_3$ is exceeded and/or a temperature $T_3$ is exceeded.

Against this background it is advantageous to design a storage depot for such replaceable cartridges such that, for example, a hydrogen probe in an exhaust gas flue is provided, which probe triggers an alarm if hydrogen is detected in the exhaust gas flue.

If during storage or transport any damage occurs, for example as a result of an accident, i.e. if the heat infeed is still further increased, then valve 6 opens, thus preventing the tank or the replaceable cartridge from bursting.

FIG. 3 shows the replaceable cartridge of FIG. 1 during removal of hydrogen.

For the sake of clarity, the arrangement shown in FIG. 3 does not show any relief valves, spray system, pressure reducers or pressure regulators, drive valves or non-return valves. However, such systems can be provided as in known arrangements.

Reference numbers 70 and 71 denote valves which by way of the couplings 110 and 111 are connectable or connected to the valves 2 and 3. By way of a removal pipe 73, valve 71 is connected to a heat exchanger 77, which in turn is connected, by way of inflow pipes 74, return pipes 75, and a valve 76, to a consumer. A return pipe 72, connected to the heat exchanger 77, is connected to valve 70.

The consumer, for example an on-board water generation device for an aircraft, or a combustion motor, is provided with air by way of the air inlet 79. Exhaust gas from the consumer can be removed by way of a corresponding exhaust system. For example water can be an exhaust gas from the consumer.

The valve 6 can for example be designed such that if a pressure $p_5$ or a temperature $T_5$ is exceeded, $GH_2$ is conveyed to the exhaust pipe 55.

Reference numbers 90, 91, 92 and 93 designate display instruments by means of which the corresponding operating states can be indicated to a user.

During removal of hydrogen, i.e. in the connected state ready for operation, the tank would normally have an operating pressure of $p_1$ to $p_2$ at about 20 Kelvin. The consumer removes hydrogen from the gas phase of the internal tank 112 and if necessary in excess. The removed gas flows by way of pipe 7, valve 3, coupling 111, valve 71 and pipe 73 to the heat exchanger 77 and then to the consumer 78. This heat exchanger heats the gas to a temperature which is above the minimum temperature required by the consumer. The removal pressure $p_1$ to $p_2$ is above the pressure required by the consumer. If more gaseous hydrogen is demanded by the consumer, valve 20 can be opened. Gaseous hydrogen is fed through the heat exchanger, is heated, and can then be returned to the tank. In this way, heat infeed to the tank takes place, which leads to evaporation of the liquid hydrogen.

In the connected quiescent state, no hydrogen is removed. The valves 2 and 3 on the side of the tank then remain open. The valves on the side of the consumer are closed, thus interrupting the hydrogen connection between the tank and the consumer. All connections remain intact. In particular, advantageously, the function of the safety valves 4, 5 and 6 remains intact.

FIG. 4 shows the replaceable cartridge of FIG. 1 during filling with hydrogen. For the purpose of filling, couplings of the filling facility are for example connected to the couplings 110 and 111. During this connection process the valves 2 and 3 are opened. By way of couplings 110 and 111, valves 2 and 3 are connected to check valves 100 and 101 which are connected to an inflow pipe 102 and an equalising pipe 103. For the purpose of filling, the check valves 100 and 101 are opened. Consequently, liquid hydrogen from the filling station flows through the pipe 102 into the internal tank 112. Volume equalisation then takes place by way of pipe 103.

Advantageously the replaceable cartridge system is designed in various forms, depending on the field of application. For example, the replaceable cartridge can be designed so as to be cylindrical, for arrangement in a spare wheel well of a vehicle, or said replaceable cartridge can for example be designed so as to be cuboid. Possible tank sizes are for example 500 l, 1000 l or 1500 l. The maximum removal quantity can for example be 250 kW or 500 kW. The replaceable cartridges can for example be operated in a stationary situation, but they can also be operated in automobiles, aircraft 800 (see FIG. 7), field vehicles, boats or ships. The maximum heat infeed can be in the order of 6 to 72 hours until evaporation. The maximum operating pressure $p_1$ to $p_2$ can be in the magnitude of 1 to 6 bar. Maximum removal quantities are of course matched to the consumers. For example, a removal quantity of 250 kW for a consumer would equate to approximately 100 kW of electrical output.

Figures 6, 7:
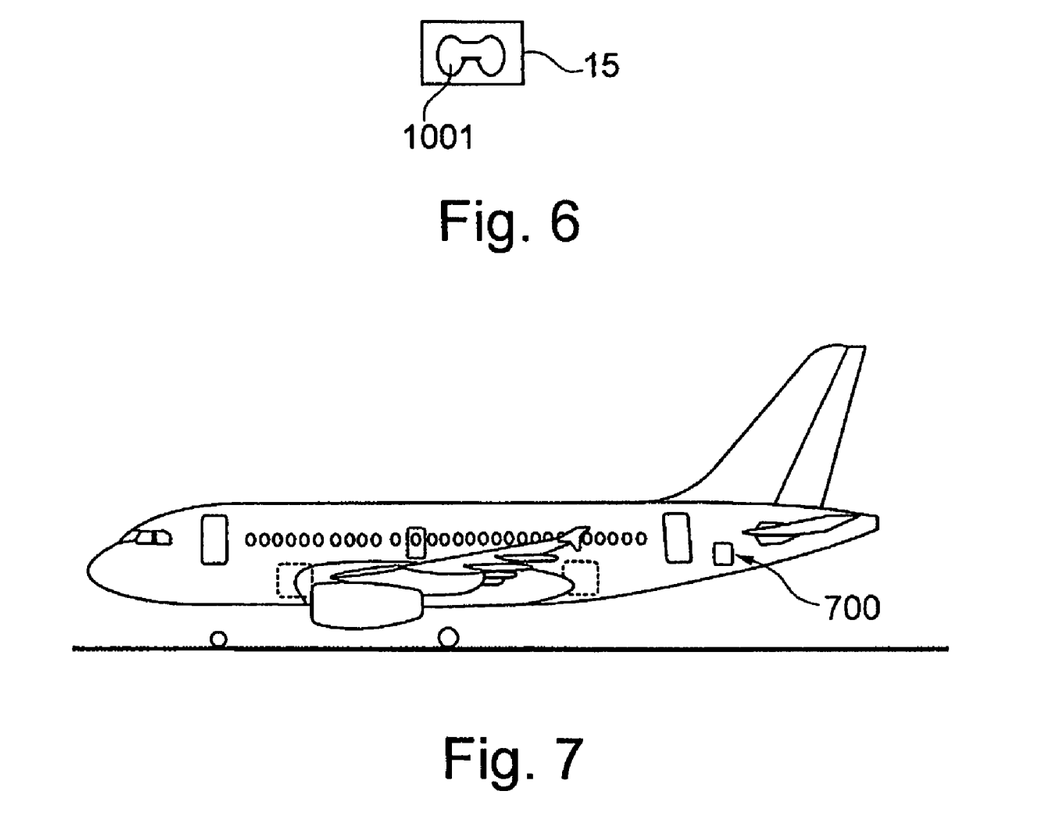
FIG. 6 shows a coupling comprising an encoding.
FIG. 7 shows an aircraft having arranged therein the replaceable cartridge according to the invention.

FIG. 6 shows that the coupling 15 may also comprise an encoding 1001 such as a form and/or dimensions of the connection couplings. Such encoding 1001 makes it possible, for example, for the user, the consumer or the filling station to detect, for example automatically, the type of replaceable cartridge involved.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. A replaceable cartridge for coupling to a consumer or to a filling station, wherein the replaceable cartridge comprises:
   at least one disconnectable connection coupling for connection to the consumer or to the filling station; and
   a tank for receiving liquid hydrogen,
wherein the tank comprises an internal tank, an external tank, and a device for supplying heat to the internal tank, and
   wherein for storing liquid or partially liquefied hydrogen, the internal tank and the external tank are thermally decoupled by means of superinsulation,
   the superinsulation having a heat transfer coefficient selected so that, when the cartridge is in use, a desired amount of heat transfer from the environment at ambient temperature to the internal tank effects formation of desired amount of gaseous hydrogen commensurate with a non-zero consumption by the consumer of the so-formed gaseous hydrogen,
   such that the replaceable cartridge does not require any regulating devices for controlling the quantity of hydrogen delivered.

2. The replaceable cartridge of claim 1,
   wherein the replaceable cartridge is designed for use in aircraft.

3. The replaceable cartridge of claim 1,
   wherein the tank is designed for holding liquid or partially liquefied hydrogen.

4. The replaceable cartridge of claim 1,
   wherein, for the purpose of filling the tank, the replaceable cartridge can be coupled to the filling station by means of the at least one disconnectable connection coupling;
   wherein the cartridge can be coupled to the consumer by means of the at least one disconnectable connection coupling in order to provide liquid hydrogen to said consumer; and
   wherein when required the replaceable cartridge can simply be disconnected from the consumer by means of the at least one disconnectable connection coupling and can be exchanged for another replaceable cartridge.

5. The replaceable cartridge of claim 1,
wherein the device for supplying heat to the internal tank controls the supplied heat; and
wherein by controlling the heat supplied to the internal tank a quantity of gaseous hydrogen to be delivered to the consumer is controlled.

6. The replaceable cartridge of claim 1,
wherein at least one protective cap is provided for the at least one disconnectable connection coupling;
wherein for the purpose of storage or transport of the replaceable cartridge, the at least one protective cap can be arranged above the at least one disconnectable connection coupling.

7. The replaceable cartridge of claim 6,
wherein the protective cap defines a space;
wherein a catalyst is provided in the space; and
wherein, by means of the catalyst, hydrogen which evaporates into the space from the at least one connection coupling is catalytically utilised.

8. The replaceable cartridge of claim 1,
wherein the replaceable cartridge comprises encoding which designates at least one type of the replaceable cartridge.

9. The replaceable cartridge of claim 8,
wherein the encoding, by means of the at least one disconnectable connection coupling, is designed such that only one connection to a consumer which corresponds to the encoding or to a filling station which corresponds to the encoding is possible.

10. An aircraft comprising a replaceable cartridge for coupling to a consumer or to a filling station, wherein the replaceable cartridge comprises:
at least one disconnectable connection coupling for connection to the consumer or to the filling station; and
a tank for receiving liquid hydrogen,
wherein the tank comprises an internal tank, an external tank, and a device for supplying heat to the internal tank; and
wherein for storing liquid or partially liquefied hydrogen the internal tank and the external tank are thermally decoupled by means of superinsulation,
the superinsulation having a heat transfer coefficient selected so that, when the cartridge is in use, a desired amount of heat transfer from the environment at ambient temperature to the internal tank effects formation of desired amount of gaseous hydrogen commensurate with a non-zero consumption by the consumer of the so-formed gaseous hydrogen,
such that the replaceable cartridge does not require any regulating devices for controlling the quantity of hydrogen delivered.

\* \* \* \* \*

UNITED STATES PATENT AND TRADEMARK OFFICE
CERTIFICATE OF CORRECTION

PATENT NO.        : 7,810,669 B2
APPLICATION NO.   : 11/072550
DATED             : October 12, 2010
INVENTOR(S)       : Andreas Westenberger It is certified that error appears in the above-identified patent and that said Letters Patent is hereby corrected as shown below:

Col. 8, Line 44, insert --a-- after "formation of"
Col. 10, Line 19, insert --a-- after "formation of"

Signed and Sealed this
Fifteenth Day of November, 2011

David J. Kappos
*Director of the United States Patent and Trademark Office*